United States Patent
Farr

[11] 3,714,560
[45] Jan. 30, 1973

[54] ELECTRICAL APPARATUS FOR MEASUREMENT OF MOISTURE CONTENT BY MEASUREMENT OF RADIO FREQUENCY POWER ABSORPTION UTILIZING A POWER LIMITING CAPACITOR

[75] Inventor: Marvin Paul Farr, San Pedro, Calif.

[73] Assignee: Ralston Purina Company, St. Louis, Mo.

[22] Filed: Nov. 17, 1970

[21] Appl. No.: 90,277

[52] U.S. Cl. ........................................ 324/61, 324/65
[51] Int. Cl. ............................................... G01r 27/26
[58] Field of Search ..................... 324/61; 331/65, 66

[56] References Cited

UNITED STATES PATENTS

| | | | |
|---|---|---|---|
| 1,976,904 | 10/1934 | Terman | 324/61 R |
| 2,021,760 | 11/1935 | Whitney | 324/61 EB |
| 2,231,035 | 2/1941 | Stevens et al. | 324/61 P |
| 3,252,086 | 5/1966 | Lundstrom | 324/61 R |
| 3,046,479 | 7/1962 | Mead et al. | 324/61 |
| 2,422,742 | 6/1947 | Odessey | 324/61 |

FOREIGN PATENTS OR APPLICATIONS 1,082,872   9/1967   Great Britain..........................324/61

*Primary Examiner*—Robert J. Corcoran
*Attorney*—Robert W. Brukardt and Lawrence J. Hurst

[57] ABSTRACT

A continuous or batch type moisture measuring device of particulate material is provided with a test cell having a radiating element centrally located therein. The radiating element is electrically connected to a solid state radio frequency oscillator circuit and as radio frequency power absorption is effected by the moisture content of the material in the test cell, this effect of the radio frequency power absorption is reflected on an indicator.

7 Claims, 3 Drawing Figures

INVENTOR
MARVIN PAUL FARR
BY
*Lawrence J. Hurst*
ATTORNEY

ELECTRICAL APPARATUS FOR MEASUREMENT OF MOISTURE CONTENT BY MEASUREMENT OF RADIO FREQUENCY POWER ABSORPTION UTILIZING A POWER LIMITING CAPACITOR

BACKGROUND OF THE INVENTION

The prior art is familiar with electronic apparatus of the power absorption type which are utilized for obtaining the moisture content of material. However, these prior art devices either relied on vacuum tubes or else required complex electrical circuitry for obtaining accurate moisture readings of this type of material. In addition, these prior art devices required a great number of electrical components including transistors and required a substantial amount of adjustments to obtain a high degree of sensitivity and stability of the circuit.

Additionally, devices of this type have been large and expensive due to the great number of parts utilized. The device of the present invention is designed to reduce the electronic components required to a minimum and still yield increased stability at a decreased cost of manufacture. In addition, the circuit of the present design can generate the oscillating radio frequency signal required and read the radio frequency power absorbance of the material with a single transistor.

SUMMARY OF THE INVENTION

Therefore, it is a general object of the present invention to provide a simplified solid state circuit for use with a test cell to measure absorbance of radio frequency energy and thereby the moisture content of particulate material within a test cell.

Another object of the present invention is to provide a simplified test cell and circuit for measuring the absorbance of radio frequency energy and thereby the moisture content of material within said test cell.

Still another object is to provide a test cell which may be adapted to receive various sized particulate material while utilizing the simplified solid state circuit.

Another important object is to provide a test cell so equipped as to allow the product to flow through the cell and, thereby, enable the moisture to be measured continuously.

Another object is to provide a circuit that enables the moisture to be recorded on a meter located at a remote distance from the test cell.

These and other objects and advantages of the present invention will become more apparent from the specification hereinafter.

Briefly, the present invention comprises a test cell having a radiating element located therein, the radiating element being electrically connected to a solid state radio frequency oscillator generator circuit, and a meter electrically connected to the radio frequency oscillator circuit for measuring the absorbance of radio frequency energy of material passed through the test cell wherein the moisture content of the material in the test cell is related to the radio frequency power absorption recorded on the meter.

BRIEF DESCRIPTION OF THE DRAWINGS

In the accompanying drawings which form a part of this specification and wherein like numerals refer to like parts wherever they occur.

DESCRIPTION OF THE PREFERRED EMBODIMENTS

Figure 1:
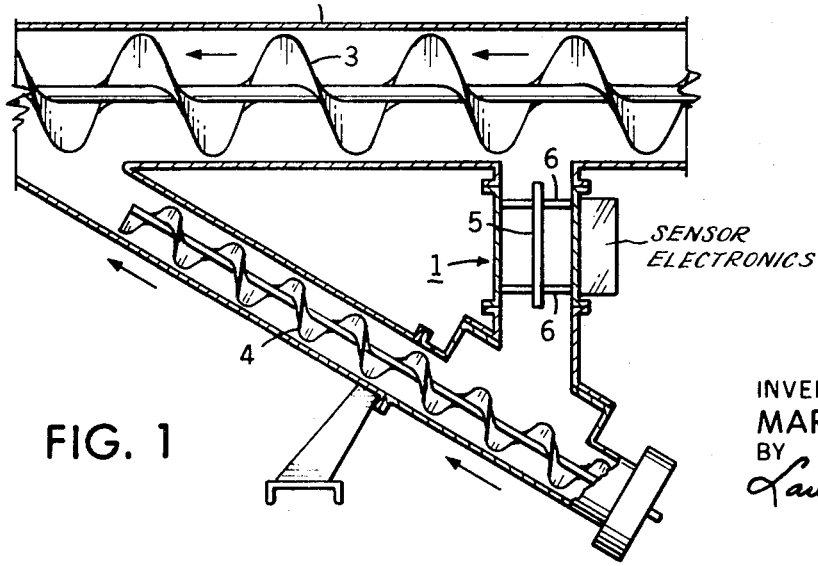
FIG. 1 is a schematic view showing a typical installation of the test cell of a moisture tester embodying the present invention.

Referring now to FIG. 1, a test cell 1 is provided beneath a feed conveyor 2 wherein particulate material is moved by a conveyor for substantially dry material, such as an auger or screw 3 therein. In addition, a second or smaller conveyor for substantially dry material 4 having an auger or screw therein is provided beneath the test cell 1 for conveying the material as it is discharged from the cell back into the main conveyor 2. It should be noted that the speed of the conveyor 4 at the discharge end of the cell is substantially slower than the feed rate of the conveyor 2 at the inlet end of the cell so as to insure that material which is fed to the inlet of the test cell 1 will always be maintained under uniform compaction and the cell will always be completely filled with material. Because the moisture content of the material being tested is to be measured or based on the radio frequency power absorbed by this material, it is essential that the volume of material within the test cell 1 be maintained substantially constant. By maintaining the volume of material in the cell substantially constant, it is possible to prevent variations in the readings obtained therefrom which might occur due to changes in the volume of material being measured. It should be understood that the test cell could also be utilized for batch operation wherein a predetermined amount of material would be placed in the cell.

The test cell 1 is constructed of a metal that is an efficient conductor of electrical current, typically brass or copper and having a wall thickness sufficient to make the cell mechanically rigid. The cell 1 is also provided with a radiating element 5 which is coaxially aligned within the cylindrical housing of the test cell. The radiating element is maintained in its coaxial alignment within the test cell housing by supports 6 which are connected to the radiating element 5 in such a manner as to prevent electrical contact between the radiating element and housing therethrough. In other words, the radiating element 5 is electrically isolated from the housing of the test cell 1.

The size of the test cell 1 will be dependent on the size of the particulate matter to be measured. For fine particle size, the diameter may be small while a larger size would be necessary for larger particle size material so that the test cell would not interfere with the flow of material therethrough. In addition, it is preferable if the length of the radiating element 5 within the housing 1 is adjusted in accordance with the range of the moisture content of the material being tested. It has been found that the lower the moisture content of the material to be measured, the longer the radiating element should be and in addition, as the particle size of the material increases, the length of the radiating element should be increased for efficiency of radio energy transfer to the material.

Figure 2:
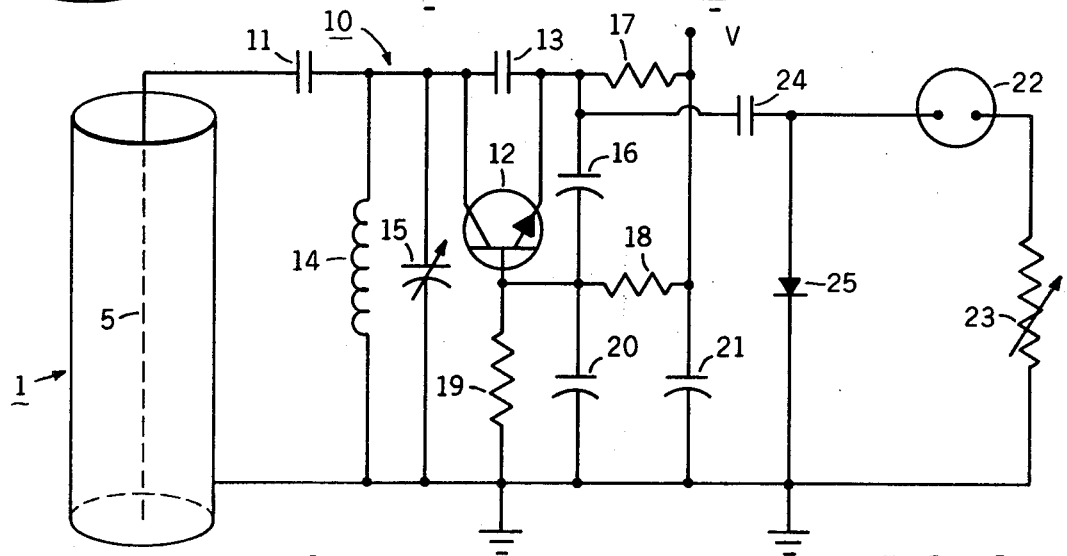
FIG. 2 is a schematic drawing of the circuit utilized by the moisture tester of the present invention.

Referring now to FIG. 2, the test cell 1 is shown having a cylindrical housing which is connected at a portion thereof to circuit ground. The radiating element which extends coaxially into the test cell housing is electrically connected to a solid state radio frequency oscillator circuit indicated generally at 10 having a capacitor 11 inserted therebetween to serve as a DC voltage blocking capacitor. The radio frequency oscillator circuit is composed of a transistor 12 typically a NPN - High Frequency transistor having a feed back capacitor 13 connected between the collector terminal and the emitter terminal of the transistor 12. In addition, the transistor is interconnected into a tuned circuit consisting of a commercially available inductance element 14 such as an Airdux No. 8161 and an adjustable capacitor 15. It should be noted either or both the inductance element 14 or the capacitor 15 should be adjustable. Therefore, if desired, the inductance element 14 could be adjustable rather than capacitor 15. The combination of the inductance element 14 and capacitor 15, at least one of which is adjustable, constitute the frequency determining tuned circuit of the radio frequency oscillator. Also connected in parallel with the transistor 12 is the capacitor 16.

A standard circuit or transistor biasing network is provided in connection with the radio frequency oscillator circuit 10 and this biasing network consists of the bias resistors 17, 18 and 19 and the capacitors 20 and 21 which serve to by-pass the bias resistors. A meter 22 is conjunction with a silicon diode 25 and a variable resistor 23 from a radio frequency power measurement circuit for sensing and indicating the power absorption of the material in the test cell. The frequency power measurement circuit is connected between the power output of the radio frequency oscillator and the circuit ground for measuring the power absorbed by the material in the test cell 1. A coupling capacitor 24 is provided between the radio frequency oscillator circuit and the meter 22 for limiting the power which is supplied from the oscillating generator circuit to the meter circuit.

Figure 3:
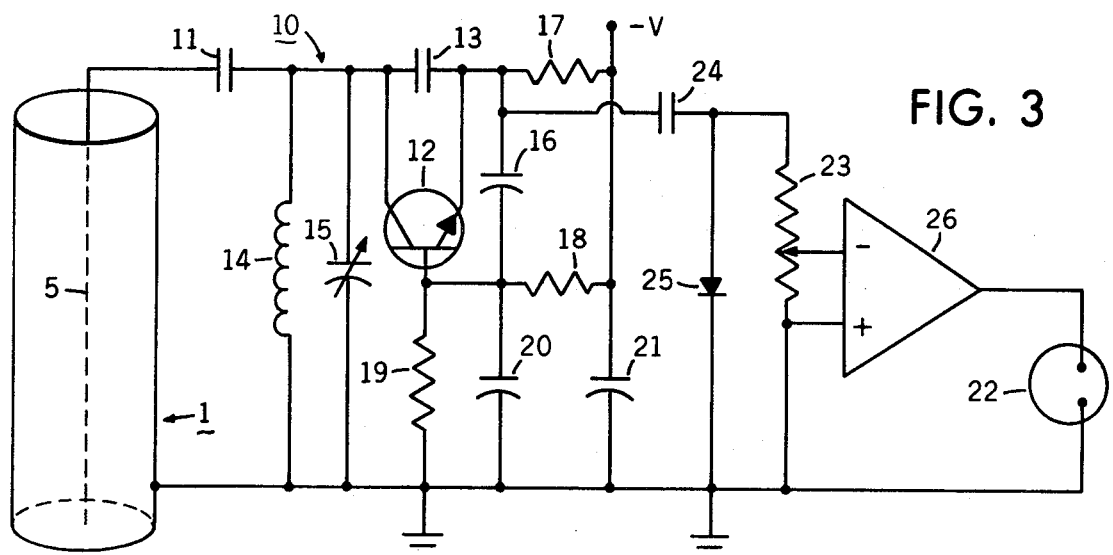
FIG. 3 is a schematic drawing of another embodiment of the circuit utilized by the apparatus of the present invention.

Referring to FIG. 3, another embodiment of the total circuit is shown. This circuit enables the meter 22 to be moved to any distance remote from the radio frequency generator circuit and the test cell 1 by inserting an amplifier 26 into the circuit such that the signal received through the limiting capacitor 24 may be transmitted at a great distance without loss of the signal being reflected as an increase in the power absorbed by the material in the test cell 1.

In operation of the subject moisture tester, power is supplied through the standard circuit for transistor biasing which serves to activate the transistor 12 and thereby produce radio frequency power from the transistor 12 to the radiating element in the test cell 1 and also through the capacitor 24. Since the capacitor 24 serves to limit the energy transmitted therethrough, the power supplied to the meter or indicating device is maintained below a predetermined value. When no power absorbing substance is present in the test cell 1, the capacitor 24 in conjunction with the variable resistor 23 are adjusted so that the reading on the meter 22 is full scale. Typically, when using a 50 microamp meter, the capacitor 24 may be of the order 27 pF and the resistor 23 of the order of 0 - 50,000 ohms.

Thereafter, as particulate material is supplied through the test cell 1 as for example as described with respect to FIG. 1, the moisture content of the particulate material serves to form a radio frequency absorbing medium between the radiating element and the housing of the test cell 1 so as to reduce the radio frequency power indicated by the radio frequency power measurement circuit. As the power requirement to the radiating element is increased, there is a corresponding decrease of power which is transmitted through the capacitor 24 resulting in a lower voltage supplied to the meter 22. This resulting reduction in the voltage being supplied to the meter 22 may then be translated into a value which represents the power absorption or moisture content of the material in the test cell 1. Calibration of the instrument is accomplished by placing a number of samples of the material to be analyzed having known and differing moisture contents into the test cell and noting the readings on the meter 22. From this information, a graph of moisture content vs. meter reading may be prepared or the meter may be scaled directly in moisture units. As previously discussed, the cell unit should be constructed to accommodate the particle size of interest and the meter must be calibrated to fit the material of interest. From the foregoing, one skilled in the art may reasonably perform this calibration with little difficulty.

In view of the foregoing, it is now apparent that a novel instrument for measuring RF power absorbance for use in moisture determinations on a continuous or batch process has been disclosed and that minor modifications or variations may be made from the description contained herein without departing from the spirit of the invention.

I claim:

1. A continuous and static moisture testing instrument for particulate materials comprising the combination of a test cell having a housing for receiving the particulate material and having a portion thereof connected to electrical ground, a radiating element aligned within said housing, a radio frequency power circuit including radio frequency oscillating generator means electrically connected through an isolating capacitor to the radiating element for supplying radio frequency power thereto, a measuring circuit including an indicating device connected between the oscillating generator means and the electrical ground and capable of indicating the amount of radio frequency power being absorbed in the test cell, and a coupling capacitor connected between said oscillating generator means and said indicating device for preventing the power supplied to said measuring circuit from exceeding a predetermined value.

2. The moisture testing instrument according to claim 1 including a transistor in the radio frequency power circuit and wherein said isolating capacitor is a DC voltage blocking capacitor connected between the radiating element and the transistor.

3. The moisture testing instrument according to claim 1 wherein the radio frequency power circuit is composed of a transistor having a feed back capacitor connected between the collector terminal and the emitter terminal of said transistor and an inductance means and an adjustable capacitor means connected in parallel between the collector terminal of the transistor and the circuit ground to set the operating frequency of the radio frequency power circuit at a predetermined value.

4. The moisture testing instrument according to claim 1 wherein the test cell comprises a cylindrical housing and said radiating element is coaxially aligned within the cylindrical housing.

5. Apparatus for measuring the radio frequency power absorbance of a test material comprising: a solid state electronic oscillator consisting of a single transistor and a tuned circuit composed of an inductor and capacitor, at least one of said inductor and capacitor being variable to allow adjustment of the resonant frequency of the tuned circuit, a test cell composed of a radiating element electrically connected through an isolating capacitor to the collector terminal of the electronic oscillator and located adjacent to a reference element electrically connected to the circuit ground, and means for sensing and indicating the power output of the electronic oscillator which decreases in proportion to the amount of power absorbed by the material in the test cell and a coupling capacitor connected between the electronic oscillator and the indicating means for preventing the power supplied to said indicating means from exceeding a predetermined value.

6. The apparatus according to claim 5 wherein the sensing and indicating means comprises a variable resistor a semiconductor diode and an indicating device interconnected across the oscillator from the emitter terminal of the transistor to circuit ground.

7. The apparatus according to claim 6 including an amplifier means electrically connected between the variable resistor and the indicating device.

* * * * *